United States Patent Office 2,976,207
Patented Mar. 21, 1961

2,976,207

DIHYDROXY-AMINOTRIAZINE INSECTICIDES

Randel Q. Little, Jr., Munster, Ind., and Jack F. Bussert, Calumet City, Ill., assignors to Standard Oil Company, Chicago, Ill., a corporation of Indiana No Drawing. Filed Feb. 27, 1959, Ser. No. 795,895

5 Claims. (Cl. 167—33)

This invention relates to compositions useful as pesticides, and more particularly is concerned with novel compositions for insecticidal, miticidal, and fungicidal use.

It has been discovered in accordance with the invention that dihydroxy-amino-triazines are highly effective in destroying insects, mites, and fungus growths. These triazines, whose formula may be depicted by the structural formula

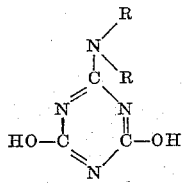

where at least one of the R groups is a hydrocarbon radical, and the other may be a hydrogen atom, appear to be non-selective pesticides, and are toxic both to sucking-type insects such as aphids and also to chewing-type pests exemplified by the spider mite. Further, it has been discovered that the dihydroxy-amino-triazines possess excellent fungicidal activity, and are capable of destroying or inhibiting common fungus growths such as brown rot (Sclerotinia fructicoli). Thus the composition of this invention performs the dual function of maintaining agricultural vegetation free from harmful insect and mite life and relatively free from rot.

In applying the compositions to vegetation, it is suitably dissolved in water in an amount between about 0.001 and 1.0% by weight and then sprayed upon the vegetation either by ground or by aeronautical spraying techniques.

Sucking-type insects are quite harmful to vegetation since they extract juices from the leaves and frequently stunt or cause destruction of the vegetation. Trees, shrubs, vegetable plants, and many other varieties of such vegetation are seriously damaged by this type of insect. From a commercial standpoint, fruit and vegetable crops are reduced in size because of damage to the foliage caused by sucking insects. Typical of this variety of sucking insect are those of the homoptera group which includes aphids, scale insects, cicada, leaf hoppers, and spittle bugs; and those of the hermiptera group such as squash bugs, stink bugs, milk weed bugs, etc. Against these insects, the inventive composition functions as a contact poison, the insect being destroyed by coming in contact with the dihydroxy-amino-triazine.

Chewing-type mites and insects such as the two-spotted spider mite, the Southern army worm, the Mexican bean beetle, etc., are likewise killed by the inventive pesticide compositions, both by coming in contact with the composition or by ingesting foliage which has been previously sprayed.

The pesticide may be applied to vegetation either during the dormant stage of vegetation or during its stage of active growth. It is generally preferred to apply this type of pesticide to vegetation during its stage of active growth, since the pesticide, as previously indicated, also possesses valuable fungicidal activity. Spraying may be conveniently accomplished by diluting the composition with water until the concentration is between about 0.001% and 1.0% by weight, and then applying the resultant solution by spraying or other suitable technique to the leaves of the vegetation, usually in amounts sufficient to completely wet the leaves. Greater or lesser concentrations may be used, depending upon the particular insect which is to be destroyed, the degree of infestation, variations in spraying techniques, weather conditions, frequency of application, etc. Typically, a concentration of from about 0.01 to about 0.1% by weight of the composition in water will be satisfactory for destroying a wide variety of insects.

For purposes of commercial distribution, it is desirable to have a liquid concentration of the composition which may be easily diluted with water to form the aqueous composition for spraying. These concentrates should contain a substantial amount, e.g. 1–100%, of the pesticide. Typical of such concentrates is an emulsifiable solution containing between about 10 and 50% by weight of dihydroxy-amino-triazine, between about 1% and about 15% by weight of an emulsifier, and the remainder a hydrocarbon distillate, preferably a relatively aromatics-free distillate such as kerosene. Any emulsifier which functions to form a stable emulsion of the dihydroxy-amino-triazine and hydrocarbon distillate in water is suitable; commercially available emulsifiers include Tween 80, which is a fatty acid ester of anhydrosorbitol which has been condensed with ethylene oxide. Other suitable emulsifiers include Span, Victawet 12, etc. Various anionic or cationic emulsifiers may also be employed.

When the pesticide is applied to vegetation during its dormant period, such as during the winter time, this may conveniently be done by adding the pesticide to an oil such as a hydrocarbon distillate which is low in aromatics, and then spraying the hydrocarbon solution onto bark of trees, shrubs, and the like, beneath which the insects live. The pesticide may be contained in the oil in amounts between about 0.001% and 1% by weight, as hereinabove discussed. A suitable oil may be, for example, acid treated kerosene.

The dihydroxy-amino-triazine of the invention may be suitably prepared by reacting equimolar amounts of a cyanuric halide, such as the chloride, bromide, or iodide, with a primary or secondary hydrocarbon amine. The reaction product is then hydrolyzed with two moles of an alkaline hydroxide, preferably an alkali metal hydroxide such as sodium hydroxide. Suitable amines for use herewith desirably contain from about 4 to about 25 carbon atoms, and include the primary alkyl amines (one R group in the previous structural formula is alkyl while the other is hydrogen); the secondary amines (both R groups are alkyl groups); the cyclic amines (both R groups are portions of a divalent alkyl group); the aromatic amines, etc. Most effective among the amines are those primary or secondary alkyl amines having from one to about twenty-five carbon atoms in each R group. Examples of suitable hydrocarbon amines include: primary amines such as methylamine, ethylamine, n-propyl-amine, i-propyl amine, n-butyl amine, s-butyl amine, i-butyl amine, n-hexylamine, n-octyl amine, n-cetyl amine, dodecyl amine, tetradecylamine, hexadecyl amine, octadecyl amine; secondary amines such as the di-alkyl amine analogues of the previously mentioned primary alkyl amines; cyclic amines such as piperidine, pyrazole; aromatic amines such as aniline, etc. Primary t-alkyl amines of 4-25 carbon atoms, preferably 8-20 carbon atoms, per molecule appear to be especially advantageous.

The following examples serve to illustrate various specific embodiments of the preparation, purification, and use of the inventive compounds.

Example 1

In this example, a dihydroxy-amino-triazine was prepared from cyanuric chloride and a primary amine (containing a mixture of t-alkyl groups of twelve to fifteen carbon atoms). To a mixture of 50 grams of cyanuric chloride in 100 ml. dioxane and 200 ml. water, 54 grams of the primary t-alkyl amine was added. The mixture was gradually warmed at atmospheric pressure while at the same time 32 grams of sodium hydroxide in 200 ml. water was added at a rate such that the reaction mixture always remained slightly alkaline (pH 8–10). The reaction mixture was then refluxed for three hours, whereafter the organic portion was decanted from the aqueous portion. The organic portion was diluted with benzene, washed with water, and then dried over anhydrous sodium sulfate. The dried material was filtered and stripped of solvent. The resultant solid product was 2,4-dihydroxy-N-t- ($C_{12}$–$C_{15}$ alkyl) aminotriazine. By analysis it contained 19.2 weight percent nitrogen; theoretical nitrogen, 18.6%.

Example 2

Leaves were infested with Green Peach aphids, a sucking insect. The leaves were then sprayed until dripping wet using water containing 0.1 weight percent of the dihydroxy-amino-triazine prepared in Example 1. Approximately 24 hours later the leaves were examined under a microscope and it was found that an average of 100% of the aphids on the treated leaves had been killed.

In a similar test, the pesticide concentration was reduced to 0.05 weight percent in water. After 24 hours the kill was 98%.

Example 3

Another set of leaves was infested with two-spotted spider mites. The leaves were then sprayed until dripping wet, using water which contained 0.025 weight percent of the dihydroxy-amino-triazine of Example 1. After 24 hours the treated leaves were examined under a microscope. It was found that an average of about 92% of the mites had been destroyed by the treatment.

The test was repeated, except using a concentration of 0.0125 weight percent of the miticide. After 24 hours, about 96% of the mites had been killed.

Example 4

In this example, the phytotoxicity of the dihydroxy-amino-triazine prepared in Example 1 was tested on bean, wheat, and tomato plants using 0.05% concentration in 1 liter of $H_2O$ containing a small amount of emulsifier (0.005%). The composition exhibited no phytotoxicity on any of these plants.

Example 5

In this example, the composition of Example 1 was tested for fungicidal activity against *Sclerotinia fructicola*, or brown rot. The test was conducted by preparing microscope slides of *S. fructicola* in a concentration of approximately 100 spores per low powered microscope field. An aqueous solution containing 500 mg./liter of the composition prepared in Example 1 was introduced in the form of a mist into an enclosed room. The microscope slide was introduced in the room for 60 seconds, after which it was withdrawn and placed in culture media for about 24 hours at 68° F. The slide was then examined under the microscope, and the percentage of spores which failed to germinate was counted. This composition inhibited about 25–50% of the *S. fructicola* spores.

Example 6

In this example, the dihydroxy-amino-triazine of Example 1 was tested for its fungicidal activity against early blight, *Alternaria oleracea*. This test was conducted in a standard humidity cabinet, and the fungicide rated "fair" against early blight.

We claim:

1. The method of increasing the resistance of vegetation to damage from insects, mites, and fungus growths which comprises applying a dihydroxy-amino-triazine to said vegetation, said dihydroxy-amino-triazine having the formula

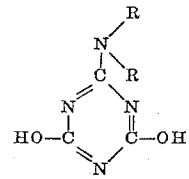

where at least one of the R groups is an alkyl radical of 4 to 25 carbon atoms and the other R group is selected from the group consisting of an alkyl radical of 4 to 25 carbon atoms and a hydrogen atom.

2. The method of claim 1 wherein one of the R groups is an alkyl radical of 4–25 carbon atoms and the other is a hydrogen atom.

3. The method of claim 1 wherein said dihydroxy-amino-triazine is 2,4-dihydroxy-N-t-($C_{12}$–$C_{15}$ alkyl) amino-s-triazine.

4. The method of claim 1 wherein said dihydroxy-amino-triazine is 2,4-dihydroxy-6-($C_{12}$–$C_{15}$ alkyl) amino-s-triazine.

5. The method of destroying insects and mites which comprises contacting said insects and mites with dihydroxy-amino-triazine.

References Cited in the file of this patent
UNITED STATES PATENTS

| | | |
|---|---|---|
| 2,487,569 | Mackey | Nov. 8, 1949 |
| 2,508,323 | Adams | May 16, 1950 |
| 2,513,264 | Holm-Hansen | June 27, 1950 |
| 2,714,057 | Chenicek | July 26, 1955 |
| 2,720,480 | Wolf | Oct. 11, 1955 |
| 2,728,767 | Wolf | Dec. 27, 1955 |